Nov. 28, 1950       M. J. ZUCROW       2,531,761
THERMAL JET AND ROCKET MOTOR PROPULSION SYSTEM
Filed Dec. 2, 1944                    2 Sheets-Sheet 1

Patented Nov. 28, 1950

2,531,761

UNITED STATES PATENT OFFICE 2,531,761

THERMAL JET AND ROCKET MOTOR PROPULSION SYSTEM

Maurice J. Zucrow, Altadena, Calif., assignor to Aerojet Engineering Corporation, Azusa, Calif., a corporation of Delaware Application December 2, 1944, Serial No. 566,334

11 Claims. (Cl. 60—35.6)

This invention relates to jet propulsion systems for aircraft and has for its object to provide a jet propulsion system operable with high efficiency over a wide range of altitudes and with improved take-off characteristics.

It has heretofore been proposed to use jet propulsion systems for aircraft, comprising an air compressor and a gas turbine in driving relation with each other, and a combustion chamber in which fuel is burned. In such systems the compressed air from the compressor is brought into the combustion chamber and heated to the desired operating temperature by burning fuel in the presence of this air and creating hot gases. The compressed hot gases leave the combustion chamber at the desired turbine throttle temperature and pressure and expand in the turbine thereby furnishing the power for driving the compressor. The exhaust gases leave the turbine and expand through a suitable exhaust nozzle so that the exit gases leave the nozzle outlet at a high velocity thereby creating a reaction force for driving the aircraft. This type of jet propulsion system is herein termed a thermal jet system.

Such thermal jet type systems operate most economically in the medium high altitudes at high airplane speeds in excess of approximately 475 miles per hour. At take-off, however, and also at extremely high altitudes, the effectiveness of the thermal jet is greatly reduced. Its relative ineffectiveness at the take-off is due to the fact that such a system designed to operate efficiently at medium high altitudes will not develop as high a static thrust to operating thrust as does the conventional engine driven variable pitch propeller. Its decreased effectiveness at the extremely high altitudes is due to the fact that at these high altitudes the air density is very low; and although the drag of the airplane is greatly reduced at these high altitudes, this reduction in drag is more than offset by a reduction in thrust, arising from the fact that the rare atmosphere at the high altitudes does not supply the compressor with as much air as at the lower altitudes, and, consequently there is a decreased combustion which has the effect of producing less of an exhaust jet. Accordingly, such a thermal jet unit has an effective ceiling beyond which it cannot ordinarily climb.

To overcome these two deficiencies of the thermal jet system I provide a jet propulsion system which meets the propulsion requirements for take-off, high speed and high altitude performance. I do this by combining a pump fed rocket propulsion system with the thermal jet propulsion system, and I correlate their functioning by the provision of a secondary turbine and combustion chamber for driving the pumps.

I provide a rocket jet propulsion motor of high impulse which can be used in take-offs to supplement the thrust from the thermal jet. Optionally, I may provide either with or without the high impulse take-off motor, a jet propulsion motor especially adapted for providing the relatively low thrust needed for cruising and climbing in the stratosphere. The pumping system may pump propellants to one, or both of these rocket jet motors, as may be the case; and I arrange the secondary pump driving turbine so that it may be driven either from the thermal jet unit or by gases generated in a separate propellant fired combustion chamber.

According to a feature of my invention I may operate the two last mentioned rocket jet motors and the propellant fired combustion chamber of the auxiliary turbine, from the same source of propellants.

By virtue of this system I am enabled to operate the take-off and the cruising rocket jet motors independently of each other, or either of them simultaneously with the thermal jet motor, while providing in all cases for the pumping of the propellants either into the take-off rocket motor or into the propellant fired combustion chamber and the auxiliary rocket cruising motors.

My invention will be more readily understood by reference to the following description and drawings, in which.

Similar numerals refer to similar parts throughout the drawings.

Figure 1:
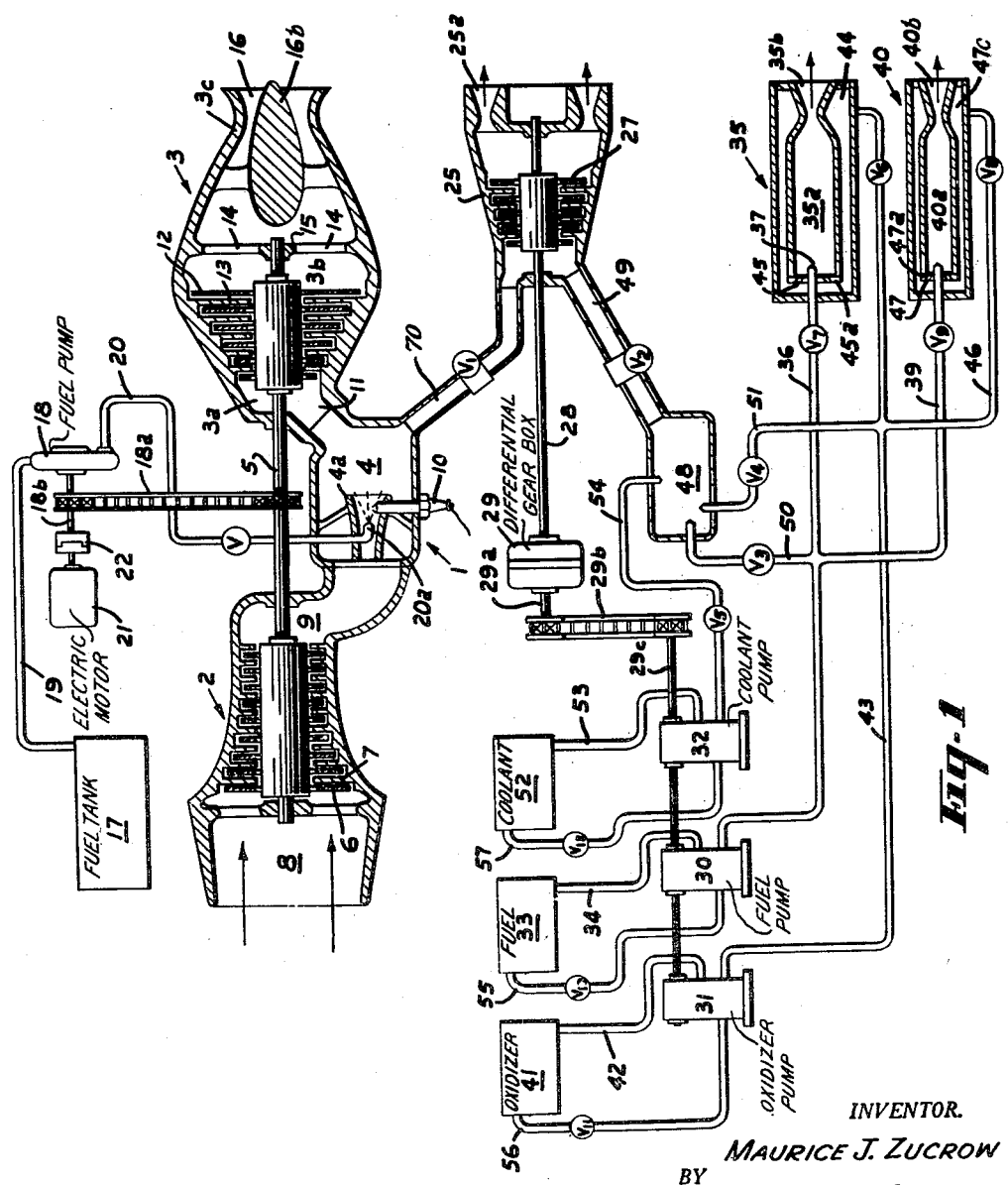
Fig. 1 is an embodiment of my invention schematically shown.

Fig. 1 shows a jet propulsion system 1 of the type commonly called a thermal jet. It comprises an air compressor 2 mounted on the same shaft 5 with a gas turbine 3. A combustion chamber 4 located between the compressor and the turbine receives a suitable fuel from a fuel source 17, through a pipe 20; and the fuel is burned with the compressed air in the fuel chamber. Compressor 2 may be of the multistage rotary type, where each stage consists of a rotary blade 6 fixed to the shaft 5 and a stationary blade 7. These stages decrease in diameter from the air intake end 8 to the air outlet end 9. The rotary blades tend to draw air into the compressor, compressing it through the various stages until it is delivered into the combustion chamber 4 where a portion of the compressed air, such as twenty or twenty-five percent, is mixed in a mixing chamber 4a with a proportionate amount of the combustible fuel which may be any of the hydrocarbons such as gasoline or Diesel oil. This mixture may be ignited by electrical or other means 10 after which continuous combustion takes place within the chamber 4. The intense heat of the combusted materials tends to expand the excess air in the chamber and force it through the manifold 11 into the turbine 3.

The turbine 3 may also be of the multistage type, each stage comprising a movable blade 12 and a stationary blade 13. These stages increase in diameter from the inlet end 3a to the outlet end 3b. The movable blades 12 are rigidly fixed to shaft 5 which extends through the turbine from the compressor. The rapid movement of the expanding gases upon the turbine blades causes the blades to rotate, driving rotor shaft 5 and the compressor 2. The expanded gases from the turbine are passed at high velocity through passages 14 formed by the bearing spider 15, and are then exhausted to the atmosphere through nozzle 16 formed by the turbine outer shell 3c and streamline portion 16b. The reaction of the gases at high velocity upon the divergent portion of the nozzle creates an axial propulsive force.

A conduit 19 connects the fuel tank 17 to the pump 18 and a conduit 20 connected to the outlet port of pump 18 directs the fuel into the mixing chamber 4a located in combustion chamber 4. Pump 18, mounted on shaft 18b, and the thermal jet motor 1 are started by an electric motor 21 through clutch 22 and a chain drive 18a. When the thermal jet motor is operating under its own power, starting motor 21 is detached from the system by disengaging clutch 22.

A manifold 70 connects combustion chamber 4 with a second turbine 25 and a pressure regulating valve $V_1$ controls the flow of gases into the turbine. This turbine is driven by the expanding gases from chamber 4 much the same as the main turbine 3, the gases being exhausted from the turbine through nozzles 25a creating an axial propulsive force supplementary to that of the thermal jet unit. Turbine 25 is smaller than turbine 3 and its rotatable blades 27 are attached to a shaft 28 which in turn is connected to a gear box 29. A similar shaft 29a having a chain drive 29b connects the gear box to a series of pumps 30, 31 and 32. The fuel pump 30 pumps fuel from its source 33, through conduit 34, through pump 30, into the combustion chamber 35a of a rocket take-off motor 35, through conduit 36 and flow control valve $V_7$. A branch conduit 39 allows the fuel to flow into the combustion chamber 40a of a cruising rocket motor 40, a flow control valve $V_9$ controlling the flow of the fuel into the chamber. An oxidizer pump 31 pumps an oxidizing fluid from its source 41 through a conduit 42 into the pump from where another conduit 43, connected to the pump outlet, directs the oxidizer liquid through flow control valve $V_6$ into the cooling chamber 44 of rocket motor 35. The oxidizer is there forced through a plurality of apertures 45 in the chamber head 45a through which it enters the combustion chamber. A branch conduit 46 of conduit 43 directs the oxidizer into cooling chamber 47 of a cruising rocket motor 40 through a flow control valve $V_8$, the oxidizer there being forced through apertures 47 in the combustion chamber head 47a through which it enters the combustion chamber.

A second combustion chamber 48 is connected by a manifold 49 to turbine 25 and a flow or pressure regulator $V_2$ is inserted in the manifold for regulating the flow of gases into the turbine. A conduit 50 carries the fuel from pump 30 through a flow control valve $V_3$ into the chamber 48 and another conduit 51 directs the oxidizer from the pump 31 through flow control valve $V_4$ into the combustion chamber. The pump 32 pumps coolant from its source 52 through conduit 53 into pump 32 and a conduit 54 connected to the pump outlet directs the coolant through a valve $V_5$ into the combustion chamber 48.

Conduits 55, 56 and 57 are connected from pumps 30, 31 and 32 through valves $V_{10}$, $V_{11}$, and $V_{12}$ to their respective sources 33, 41 and 52; and the fluid flowing through these conduits tends to keep the pumps cool after the airplane take-off has been accomplished and the take-off rocket system has been shut down.

The system operates in the following manner: Before starting, all the valves are closed except $V_{10}$, $V_{11}$, and $V_{12}$, and the starting means 21 is energized causing clutch 22 to drive chain drive 18a and shaft 5. This causes the compressor blades 6 to rotate, sucking in air and compressing the air through the various stages. The compressed air is exhausted into the combustion chamber 4. The valve V is opened and the fuel pump 18 which is connected through chain drive 18a to rotating shaft 5 pumps fuel from its source 17 through conduit 19 into conduit 20 which ends in a spray nozzle 20a, and the fuel being a hydrocarbon such as gasoline or Diesel oil is sprayed from this nozzle and mixed with a proportionate amount of the compressed air in the mixing chamber 4a. The spark plug or other electrical means 10 ignites this mixture creating hot gases which tend to expand and heat up the unburned portion of air in the chamber 4 causing it to enter the turbine 3 through manifold 11. The high velocity of the expanding hot gases passing over the turbine blades 12, causes the blades to rotate the shaft 5 which drives compressor 2. As soon as the turbine is started, starting means 21 is declutched and the system runs under its own power. The expanded gases exhausted from the turbine pass through passages 14 at high velocity and are exhausted into the atmosphere through nozzle 16. The resultant reaction of these gases leaving the nozzle 16 creates high thrust which is used for the aircraft propulsion.

When the thermal jet motor is operating steadily the valves $V_1$, $V_6$ and $V_7$ may be opened, starting the take-off rocket system. The gases from the chamber 4 are carried through channel 70 and valve $V_1$ into the turbine 25. These gases react upon the blades 27 of the turbine causing them to rotate the shaft 28. The differential gear box 29 has its high speed gear attached to shaft 28 while its low speed shaft 29a is connected through chain drive 29b to shaft 29c which is the driving medium for the pumps 30, 31 and 32, the function of said pumps being to supply a liquid fuel such as aniline and a liquid oxidizer such as red fuming nitric acid to the take-off rocket motor 35 and cruising motor 40. With the pumps running steadily under the influence of turbine 25 the valves $V_{10}$, $V_{11}$, and $V_{12}$ may be opened. A conduit 36 directs the flow of fuel from the outlet orifice of pump 30 to the combustion chamber 35a of rocket 35, the conduit ending in a spray nozzle 37 inside the combustion chamber, which breaks the solid stream of liquid fuel into a fine spray inside the combustion chamber. The valve $V_7$ controls the rate of flow of the fuel into the combustion chamber. The conduit 43 directs the flow of oxidizer liquid from the outlet port of pump 31 to the cooling chamber 44 of the rocket motor 35. The valve $V_6$ controls the rate of flow of the oxidizer into the chamber. The oxidizer liquid is circulated around the rocket nozzle and along the full length of the combustion chamber and enters said chamber through apertures 45 provided in the combustion chamber end plate 45a. The liquid fuel and liquid oxidizer being combustible on contact causes combustion within the chamber and the resultant gases are exhausted from the combustion chamber through the Venturi-type nozzle 35b and the reaction of this escaping gas at high velocity from the nozzle 35b creates a force in the nature of an axial force along the horizontal center line of the rocket, thus giving additional speed or forward motion to an aircraft to which the rocket is attached. With the aid of the take-off rocket motor the aircraft can be quickly taken off the ground.

When the aircraft is off the ground, and its velocity is sufficiently above the stalling speed, valves $V_{10}$, $V_{11}$, and $V_{12}$ are opened and valves $V_1$, $V_6$, and $V_7$ are closed shutting off the supply of propellants to rocket 35. The aircraft is now being propelled by the thermal jet unit alone. At extremely high altitudes, for instance 50,000 feet, which is in the stratosphere, the air is less dense, the atmospheric density, pressure and drag on an aircraft are reduced. This tends to decrease the propulsive thrust of the thermal jet to the point where the airplane speed can be maintained with a relative smaller thrust. If it is desired to climb higher and attain higher speeds the thermal jet motor 1 becomes incapable of producing the necessary thrust. Therefore, the pilot of the aircraft may put into operation the cruising rocket system which produces a thrust ranging from about 250 to 700 pounds depending upon the size of the aircraft which is all that is necessary to propel the aircraft at extremely high speeds at extremely high altitudes. This operates in the following manner: Valve $V_1$ is opened allowing hot gases from the combustion chamber 4 to enter the turbine 25 operating it in the same manner as previously described.

The pumps 30, 31 and 32 are again operating from the common shaft 29c and fuel is pumped from its source through conduit 34 into pump 30 and from the pump outlet through a branch conduit 50 into the combustion chamber 48, the flow of fuel being controlled by control valve $V_3$. Pump 31 supplies oxidizer to the combustion chamber 48 through conduit 51 and control valve $V_4$. Pump 32 pumps a cooling liquid for cooling the chamber walls, from its source 52 through conduit 53 through said pump. A conduit 54, connected from the outlet port of the pump, carries the coolant to the combustion chamber 48. A liquid flow control valve $V_5$ controls the flow of the liquid into the chamber. The fuel and oxidizer are caused to impinge upon each other inside the chamber 48 causing spontaneous combustion of the fluids. The resultant hot gases are passed into the turbine 25 through manifold 49 and valve $V_2$ and tend to rotate blades 27 and shaft 28 which in turn operates the pumps 30, 31 and 32 through gear box 29 and chain drive 29b. The valve $V_1$ may now be closed, as the turbine will function independently of the thermal jet system.

A branch conduit 39 leading from conduit 36 directs the fuel into the combustion chamber of rocket 40; and another branch conduit 46 directs the oxidizer into the cooling chamber of said rocket and through apertures 47 of the combustion chamber headplate 47a of rocket 40. The impingement of the fuel and oxidizer, one upon the other causes combustion within the rocket combustion chamber, the resultant gases escaping through the Venturi-nozzle 40b at high velocity results in an axial force along the horizontal center line of the rocket. This force is sufficient to drive the aircraft in rarefied atmosphere such as the stratosphere.

To return the system to thermal jet propulsion, starting means 21 is again energized, valves $V_1$ and $V_2$ are closed and the unit repeats the cycle as heretofore described.

Figure 2:
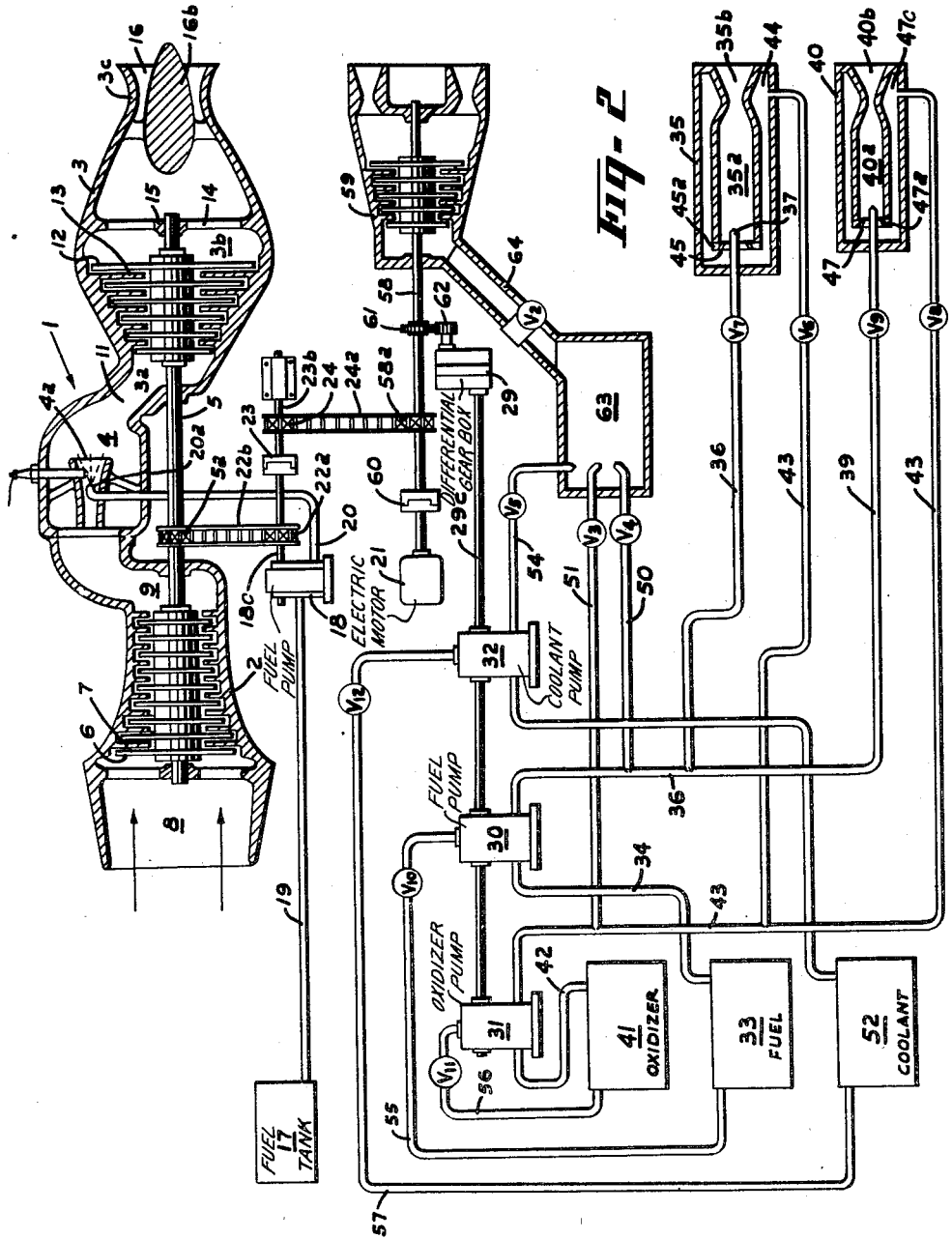
Fig. 2 is a modified embodiment of my invention schematically shown.

A modification of my invention is illustrated in Fig. 2 shows an arrangement similar to that in Fig. 1. The difference between the two arrangements resides in the method of driving the auxiliary turbine and in the arrangement of the system starting means.

The fuel pump 18, which pumps fuel from its source 17 to the combustion chamber 4 of the thermal jet motor 1, has affixed to its drive shaft 18c a sprocket 22a. The sprocket engages a driving chain 22b which in turn engages a sprocket 5a affixed to shaft 5 of the thermal jet motor 1. The pump drive shaft 18c terminates in a clutch 23. A shaft 23b affixed to the free end of clutch 23 has a driving sprocket 24 engaging a drive chain 24a which engages a sprocket 58a affixed to the rotor shaft 58 of a turbine 59. The shaft 58 is connected to the driving means 21 through a clutch 60.

A differential gear box 29 is provided for operating pumps 30, 31 and 32, through shaft 29c, said gear box being driven by turbine 59 through gears 61 and 62. The gear 61 is mounted on shaft 58 while gear 62 is affixed to the high speed drive of gear box 60.

A combustion chamber 63 is connected to turbine 59 by a manifold 64 and a flow control valve $V_2$ is inserted into the manifold. Fuel, oxidizer and coolant are supplied to the combustion chamber 63 through the pumps 30, 31 and 32 and the conduits 50, 51 and 54.

The system operates in the following manner: By energizing the starting means 21, the thermal jet motor 1, the fuel pump 18, the turbine 59, gear box 29 and pumps 30, 31 and 32 are all started simultaneously. Pumps 30, 31 and 32 pump fuel, oxidizer and coolant into the combustion chamber 63, through conduits 50, 51, and 54 and valves $V_3$, $V_4$ and $V_5$. The fuel and oxidizer are combustible upon contact with each other and generate a continuous supply of hot gases which are conducted to the turbine 59 through the manifold 64 and valve $V_2$ causing the turbine to rotate and drive the pumps through gears 61 and 62 and gear box 29. The starting means is then disconnected from shaft 58 through clutch 60.

The operation of the take-off rocket motor is similar to that described in connection with Fig. 1. When the cruising rocket motor is in operation the thermal jet motor system may be disconnected from the rocket system by disengaging clutch 23. The cruising motor supplies sufficient thrust to sustain the aircraft in flight in the rarefied air of the stratosphere. When high speed or fast climbing is desired the thermal jet and the cruising rocket jet may operate together.

The thermal jet motor may be reactuated without the use of starting means 21 by reengaging clutch 23 as long as turbine 59 is operating.

It should be understood that the invention is not limited to the particular arrangements and embodiments illustrated and described herein, which are shown merely to illustrate the invention and the invention is limited only in accordance with the appended claims.

I claim:

1. In combination with a thermal jet system for propelling an aircraft, comprising an air compressor, a gas turbine mechanically linked to the compressor, and a combustion chamber into which fuel is introduced and burned in the air from the compressor to provide heat pressurized gases for driving the turbine, the improvement which comprises a second turbine, a second combustion chamber and a source of propellant for introduction into the second combustion chamber, means for driving the second turbine from said second combustion chamber, a rocket jet motor operated from said propellant, pumping means driven from the second turbine for pumping propellant into the rocket jet motor and into the second combustion chamber, and means disconnectably connected with the thermal jet system for driving the pumping means.

2. Apparatus according to claim 1 in which there is more than one rocket jet motor operated from said propellant, at least one of the rocket jet motors producing substantial impulse for the take-off, and another of the rocket jet motors producing a lower impulse than the take-off motor.

3. In combination with a thermal jet system for propelling an aircraft, comprising an air compressor, a gas turbine mechanically linked to the compressor and a combustion chamber in which a fuel and air mixture from the compressor is burned to provide gases for driving the turbine, the improvement comprising a second turbine, a second combustion chamber, a first conduit means containing a valve for conveying gas from the first-mentioned combustion chamber to the second turbine, a second conduit means containing a valve for conveying gas from the second combustion chamber to the second turbine, a source of propellant for introduction into the second combustion chamber, a rocket jet motor adapted to produce a thrust for take-off, pumping means operated from the second turbine for pumping the propellant into the second combustion chamber and the rocket jet motor, and valve means for disconnecting the rocket jet motor from the propellant when take-off has been completed.

4. In combination with a thermal jet system, comprising an air compressor, a gas turbine mechanically linked to the compressor and a combustion chamber in which a fuel is burned with air from the compressor to provide gases for driving the turbine, the improvement comprising a second turbine mechanically linked to the thermal jet system, a second combustion chamber, a source of propellant for introduction into the second combustion chamber, means for driving the second turbine from said second combustion chamber and means for disconnecting the second turbine from the thermal jet system when said second turbine is operating from the second combustion chamber gases.

5. A jet propulsion power system for propelling an aircraft comprising a gas turbine having an exhaust jet nozzle, an air compressor driven by the turbine, a chamber in which air from the compressor and fuel are introduced and burned to provide gas for driving the turbine, a secondary gas turbine having an exhaust jet nozzle, a rocket motor having an exhaust jet nozzle, a second combustion chamber for supplying operating gas to the second turbine, a fuel source for the second combustion chamber and the rocket motor, a pumping means for pumping fuel from said source to the second combustion chamber and the rocket motor, a drive for driving said pumping means from the second turbine, means for driving the second turbine from the first mentioned turbine and means for disconnecting the last mentioned drive.

6. A jet propulsion system for propelling an aircraft, comprising a gas turbine having an exhaust nozzle, an air compressor driven by the turbine, a main drive shaft connecting the turbine and compressor, a chamber in which proportionate parts of air and fuel are burned for driving the turbine, a secondary turbine having a secondary drive shaft, a first intermediate shaft and a second intermediate shaft and a clutch between them, a mechanical linkage between the main shaft and the first intermediate shaft and a mechanical linkage between the second intermediate shaft and the secondary drive shaft whereby the second turbine is operated by the first turbine when the clutch is engaged.

7. A jet propulsion system for propelling an aircraft, comprising a gas turbine having an exhaust nozzle, an air compressor driven by the turbine, a combustion chamber in which air and fuel are burned to provide gases for driving the turbine, a secondary turbine having an exhaust nozzle, means for connecting the combustion chamber to the secondary turbine through which gases from the combustion chamber are utilized for operating the second turbine simultaneously with the first mentioned turbine, a second combustion chamber, pumping means driven from the second turbine and adapted to feed fuel to the second combustion chamber and means connecting the second combustion chamber with the second turbine whereby gases from the second combustion chamber may be used to operate the second turbine independently of the first combustion chamber.

8. A system according to claim 7 which comprises a rocket motor, and said pumping means operated by the second turbine is adapted to pump fuel to the second combustion chamber and to the rocket motor simultaneously.

9. In combination with a thermal jet system for propelling an aircraft, comprising an air compressor, a gas turbine mechanically linked to the compressor and a combustion chamber into which fuel is introduced and burned in the air from the compressor to provide heat and pressurized gases for driving the turbine, the improvement which comprises a second turbine, a second combustion chamber and a source of propellant for introduction into the second combustion chamber, means for driving the second turbine from said second combustion chamber, a rocket jet motor operated from said propellant, pumping means driven from the second turbine for pumping the propellant into the rocket jet motor and into the second combustion chamber and independent means coupling the second turbine to the thermal jet system, whereby the second turbine and the thermal jet system can each drive the other.

10. In combination with a thermal jet system for propelling an aircraft, comprising an air compressor, a gas turbine mechanically linked to the compressor and a combustion chamber into which fuel is introduced and burned in the air from the compressor to provide heat and pressurized gases for driving the turbine, the improvement which comprises a second turbine, a second combustion chamber and a source of propellant for introduction into the second combustion chamber, means for driving the second turbine from said second combustion chamber, a plurality of rocket jet motors operated from said propellant, at least one of the rocket jet motors producing substantial impulse for the take-off and another of the rocket jet motors producing a lower impulse than the take-off motor, pumping means driven from the second turbine for pumping the propellant into the rocket jet motors and into the second combustion chamber, and independent means for driving the second turbine from the thermal jet system.

11. In combination with a thermal jet system for propelling an aircraft, comprising an air compressor, a gas turbine mechanically linked to the compressor and a combustion chamber into which fuel is introduced and burned in the air from the compressor to provide heat and pressurized gases for driving the turbine, the improvement which comprises a second turbine, a second combustion chamber and a source of propellant for introduction into the second combustion chamber, means for driving the second turbine from said second combustion chamber, a rocket jet motor operated from said propellant, pumping means driven from the second turbine for pumping the propellant into the rocket jet motor and into the second combustion chamber, independent means for driving the second turbine from the thermal jet system, and valve means for driving the second turbine simultaneously with the first-mentioned turbine either from the thermal jet combustion chamber or from the second combustion chamber.

MAURICE J. ZUCROW.

REFERENCES CITED

The following references are of record in the file of this patent:

UNITED STATES PATENTS

| Number | Name | Date |
|---|---|---|
| 1,888,749 | Urquhart | Nov. 22, 1932 |
| 2,217,649 | Goddard | Oct. 8, 1940 |
| 2,326,072 | Seippel | Aug. 3, 1943 |
| 2,409,177 | Allen et al. | Oct. 15, 1946 |

FOREIGN PATENTS

| Number | Country | Date |
|---|---|---|
| 541,349 | Great Britain | Nov. 24, 1941 |
| 522,163 | France | Mar. 22, 1921 |